United States Patent
Yu et al.

(10) Patent No.: US 12,095,387 B2
(45) Date of Patent: Sep. 17, 2024

(54) MULTI-LEVEL DIRECT CURRENT CONVERTER AND POWER SUPPLY SYSTEM

(71) Applicant: Huawei Technologies Co., Ltd., Shenzhen (CN)

(72) Inventors: Guolei Yu, Dongguan (CN); Shuchao Song, Hangzhou (CN); Junliang Qin, Dongguan (CN); Zhiqiang Xiang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 228 days.

(21) Appl. No.: 17/896,517

(22) Filed: Aug. 26, 2022

(65) Prior Publication Data
US 2023/0061103 A1 Mar. 2, 2023

(30) Foreign Application Priority Data
Aug. 26, 2021 (CN) .......................... 202110989407.1

(51) Int. Cl.
*H02M 3/158* (2006.01)
*H02M 1/00* (2006.01)
*H02M 7/483* (2007.01)
*H02M 7/487* (2007.01)

(52) U.S. Cl.
CPC ....... *H02M 7/4837* (2021.05); *H02M 1/0095* (2021.05); *H02M 3/158* (2013.01); *H02M 7/487* (2013.01)

(58) Field of Classification Search
CPC .... H02M 1/0095; H02M 3/158; H02M 7/487; H02M 7/4837
See application file for complete search history.

(56) References Cited

U.S. PATENT DOCUMENTS

| | | | |
|---|---|---|---|
| 11,646,665 B2 * | 5/2023 | Wu | H02M 1/0045 327/109 |
| 2022/0393594 A1 * | 12/2022 | Han | H02M 3/157 |
| 2023/0068627 A1 * | 3/2023 | Sharifi | H03K 17/687 |

* cited by examiner

*Primary Examiner* — Gary L Laxton
(74) *Attorney, Agent, or Firm* — Conley Rose, P.C.

(57) ABSTRACT

A multi-level direct current converter includes a direct current conversion unit, a switching unit, a voltage management unit, and a controller. The direct current conversion unit includes a flying capacitor, a first power transistor, and a second power transistor. A first end of the first power transistor is connected to a voltage input end of the multi-level direct current converter, a second end of the first power transistor is connected to a first end of the second power transistor by using the flying capacitor, and a second end of the second power transistor is connected to a reference ground.

20 Claims, 8 Drawing Sheets

FIG. 7

MULTI-LEVEL DIRECT CURRENT CONVERTER AND POWER SUPPLY SYSTEM

CROSS-REFERENCE TO RELATED APPLICATION

This application claims priority to Chinese Patent Application No. 202110989407.1 filed on Aug. 26, 2021, which is hereby incorporated by reference in its entirety.

TECHNICAL FIELD

This disclosure relates to the field of electronic circuit technologies, and in particular, to a multi-level direct current converter and a power supply system.

BACKGROUND

Based on a level state of a switching node, direct current (DC)/DC converters may be classified into two types: a two-level topology and a multi-level topology. Levels of a switching node of the two-level topology are 0 and an input voltage, and a switching node of the multi-level topology has more than two levels.

A flying-capacitor clamped three-level direct current converter (or three-level direct current converter) is one of DC/DC converters of the multi-level topology, and has the following feature. A half input voltage is stored by using a flying capacitor, so that a voltage of a switching node has three level states: 0, ½ of an input voltage, and the input voltage. Change amplitude of each time of switching of the three-level direct current converter changes to ½ of the input voltage, so that system performance can be improved by using a component with a low withstanding voltage and high performance. When the three-level direct current converter starts, before a power transistor starts to be switched, a voltage of the flying capacitor needs to reach ½ of the input voltage through precharging, to ensure normal operating of the three-level direct current converter.

Figure 1:
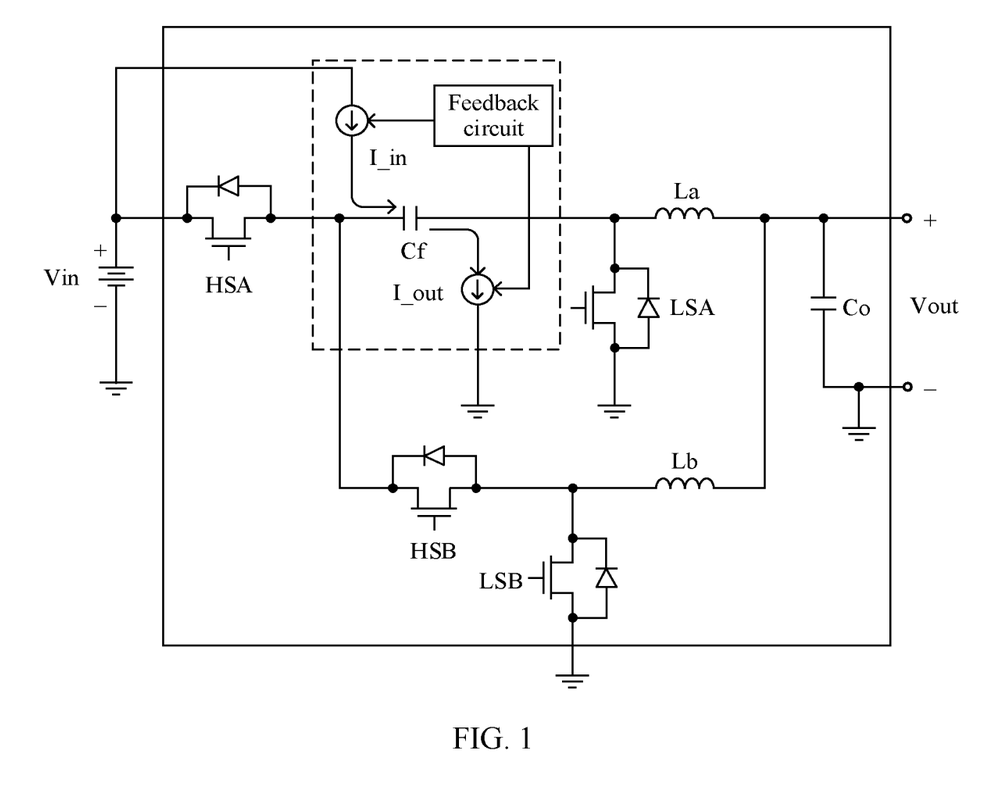
FIG. 1 is a schematic diagram of a structure of a three-level direct current converter according to the conventional technology.

In a three-level direct current converter shown in FIG. 1, a charging loop of a flying capacitor Cf is mainly formed by using current sources I_in and I_out. A specific implementation is as follows. When an upper plate of Cf is charged by using I_in, a lower plate of Cf is discharged by an equal amount by using I_out. In addition, a voltage of the lower plate of Cf is controlled by using a feedback circuit, to ensure that there is enough voltage headroom between I_in and I_out, thereby charging Cf. However, the additional current sources and feedback circuit are required in the foregoing manner. In addition, a detection circuit is further required for stopping charging of Cf after detecting that precharging of Cf is completed. Therefore, a structure is complex, and circuit costs are high.

SUMMARY

This disclosure provides a multi-level direct current converter and a power supply system. A charging loop of a flying capacitor may be formed by configuring existing power transistors in the multi-level direct current converter, to precharge the flying capacitor, without an additional charging component, so that a structure is simple, and circuit costs are low.

According to a first aspect, this disclosure provides a multi-level direct current converter. The multi-level direct current converter includes a direct current conversion unit, a switching unit, a voltage management unit, and a controller. The direct current conversion unit includes a flying capacitor and at least two power transistors connected in series, the at least two power transistors include a first power transistor and a second power transistor, a first end of the first power transistor is connected to a voltage input end of the multi-level direct current converter, a second end of the first power transistor is connected to a first end of the second power transistor by using the flying capacitor, and a second end of the second power transistor is connected to a reference ground. An output end of the voltage management unit is connected to a third end of the first power transistor by using the switching unit, and the controller is connected to the switching unit and a third end of the second power transistor. When detecting that an input voltage of the voltage input end starts to rise from an initial voltage, the controller controls the switching unit to connect the voltage management unit to the first power transistor, to output a preset voltage to the first power transistor by using the voltage management unit, and controls the second power transistor to be conducted, to charge the flying capacitor by using a charging loop including the voltage management unit, the first power transistor, and the second power transistor. No additional charging component is required in an entire charging process of the flying capacitor, so that a structure is simple, circuit costs are low, and applicability is strong.

With reference to the first aspect, in a first possible implementation, the voltage management unit is a voltage follower, an input voltage of a non-inverting input end of the voltage follower is determined by the input voltage of the voltage input end, an inverting input end of the voltage follower is connected to the second end of the first power transistor, and an output end of the voltage follower is used as the output end of the voltage management unit. Because the voltage follower has a simple structure, an area is reduced, and applicability is strong.

With reference to the first aspect, in a second possible implementation, when the multi-level direct current converter is an N-level direct current converter, the input voltage of the non-inverting input end of the voltage follower is $(N-2)/(N-1)$ of the input voltage of the voltage input end, where N is an integer greater than 2. Due to a concept of a virtual short circuit, the input voltage of the non-inverting input end and an input voltage of the inverting input end of the voltage follower are equal and are both $(N-2)/(N-1)$ of the input voltage, and the inverting input end is connected to a source of the first power transistor. Therefore, a voltage of the source of the first power transistor is $(N-2)/(N-1)$ of the input voltage in the entire charging process of the flying capacitor. In this way, it can be learned that voltage stress of the first power transistor in the entire charging process of the flying capacitor is $1/(N-1)$ of the input voltage. Therefore, in this manner, voltage stress of the first power transistor in the entire charging process can be effectively reduced, thereby prolonging a service life of the first power transistor.

With reference to the first aspect, in a third possible implementation, the voltage management unit includes a first resistor, a second resistor, a direct current source, and a third power transistor. One end of the first resistor is connected to the voltage input end and one end of the direct current source, the other end of the first resistor is connected to one end of the second resistor and a first end of the third power transistor, the other end of the second resistor is connected to the reference ground, the other end of the direct current source is connected to a second end of the third power transistor, a third end of the third power transistor is connected to the reference ground, the multi-level direct current converter is an N-level direct current converter, and a ratio between a resistance value of the first resistor and a resistance value of the second resistor is 1/(N−2). The voltage management unit is implemented in various manners and has high flexibility.

With reference to the first aspect, in a fourth possible implementation, the third power transistor is a metal-oxide-semiconductor (MOS) field-effect transistor (FET) (or MOSFET), and the first end, the second end, and the third end of the third power transistor are respectively a gate, a source, and a drain of the third power transistor. Due to a strong through-current capability of the MOSFET, a charging current may be appropriately increased within a tolerable current range of the power transistor in a charging process of the flying capacitor, thereby shortening precharging duration of the flying capacitor.

With reference to the first aspect, in a fifth possible implementation, when the input voltage of the voltage input end of the multi-level direct current converter rises to a target voltage, the controller may further control the switching unit to disconnect the voltage management unit from the first power transistor and connect the controller to the third end of the first power transistor, and control the second power transistor to be cut off. Therefore, when the input voltage of the voltage input end rises to the target voltage, charging of the flying capacitor automatically ends, without an overcharge risk, so that precharging duration of the flying capacitor can be shortened by using a relatively large charging current.

With reference to the first aspect, in a sixth possible implementation, the direct current conversion unit further includes a fourth power transistor, and the fourth power transistor is connected to the second power transistor in parallel and is connected to the controller. When the input voltage of the voltage input end starts to rise from the initial voltage, the controller may further control the fourth power transistor to be conducted, until the input voltage of the voltage input end is the target voltage. A parallel charging branch circuit may be added by adding a parallel power transistor, to increase a charging current. In this way, precharging duration of the flying capacitor is shortened, so that applicability is strong.

With reference to the first aspect, in a seventh possible implementation, when the multi-level direct current converter is a three-level direct current converter, the at least two power transistors further include a fifth power transistor and a sixth power transistor. The second end of the first power transistor is connected to a first end of the fifth power transistor, a second end of the fifth power transistor is connected to a first end of the sixth power transistor, a second end of the sixth power transistor is connected to the first end of the second power transistor, and a third end of the fifth power transistor and a third end of the sixth power transistor are both connected to the controller.

With reference to the first aspect, in an eighth possible implementation, each of the at least two power transistors connected to each other in series is MOSFET. A first end of each power transistor is a drain of the power transistor, a second end of the power transistor is a source of the power transistor, and a third end of the power transistor is a gate of the power transistor. Due to a strong through-current capability of the MOSFET, a charging current may be appropriately increased within a tolerable current range of the power transistor in a charging process of the flying capacitor, thereby shortening precharging duration of the flying capacitor.

According to a second aspect, this disclosure provides a power supply system. The power supply system includes a photovoltaic string and the multi-level direct current converter that is provided in any one of the first aspect to the possible implementations of the first aspect and that is connected to the photovoltaic string. The multi-level direct current converter is applicable to a photovoltaic power supply scenario, and has strong applicability.

With reference to the second aspect, in a first possible implementation, the power supply system further includes a direct current circuit breaker, and the photovoltaic string is connected to an input end of the multi-level direct current converter by using the direct current circuit breaker. The direct current circuit breaker can trigger over-current protection when an absolute value of a current exceeds a specific range of a rated current value, to cut off a current in a loop, thereby protecting the power supply system.

With reference to the second aspect, in a second possible implementation, the power supply system further includes a direct current combiner box, and the photovoltaic string is connected to an input end of the multi-level direct current converter by using the direct current combiner box. Because each input of the direct current combiner box is independently equipped with a solar photovoltaic direct-current high-voltage lightning protection circuit, the direct current combiner box has a multi-level lightning protection function, to ensure that a lightning stroke does not affect normal output of a photovoltaic array, thereby improving stability of the power supply system.

With reference to the second aspect, in a third possible implementation, the power supply system further includes an inverter, and an output end of the multi-level direct current converter is connected to the inverter.

With reference to the second aspect, in a fourth possible implementation, the power supply system further includes a direct current bus, and the output end of the multi-level direct current converter is connected to the inverter by using the direct current bus.

It should be understood that mutual reference may be made to implementations and beneficial effects of the plurality of aspects of this disclosure.

DESCRIPTION OF EMBODIMENTS

A DC/DC converter is a commonly-used switching power supply component in an electronic system. A main function of the DC/DC converter is converting a direct current input voltage into a direct current output voltage of another electric potential, to meet a power supply requirement of an electronic system at a load end. Based on a level state of a switching node, DC/DC converters may be classified into two types: a two-level topology and a multi-level topology. Levels of a switching node of the two-level topology are 0 and an input voltage, and a switching node of the multi-level topology has more than two levels. When a DC/DC converter of the multi-level topology, namely, a multi-level direct current converter, starts, before a power transistor starts to be switched, a voltage of at least one flying capacitor in the multi-level direct current converter needs to reach a preset multiple of an input voltage through precharging, to ensure normal operating of the multi-level direct current converter, and keep stress at two ends of the power transistor within an allowable range. In an operating state, voltages of flying capacitors can be controlled by finely adjusting duty cycles. In a precharging state, the flying capacitor needs to be precharged by using different voltage precharging circuits.

This disclosure provides a multi-level direct current converter and a power supply system. A charging loop of a flying capacitor may be formed by configuring power transistors in the multi-level direct current converter, without an additional charging component, so that a structure is simple, and circuit costs are low.

The multi-level direct current converter provided in this disclosure may be adapted to different application scenarios, for example, a data center power supply scenario (to supply power to a load chip), a photovoltaic power supply scenario, an optical storage hybrid power supply scenario, and an energy storage power supply scenario. In the photovoltaic power supply scenario, a photovoltaic string is coupled to an input end of a multi-level direct current converter. In the optical storage hybrid power supply scenario, a photovoltaic string and an energy storage battery string are coupled to an input end of a multi-level direct current converter. In an energy storage power supply scenario, an energy storage battery string is coupled to an input end of a multi-level direct current converter. The following separately uses the data center power supply scenario and the photovoltaic power supply scenario as examples for description.

Figure 2A:
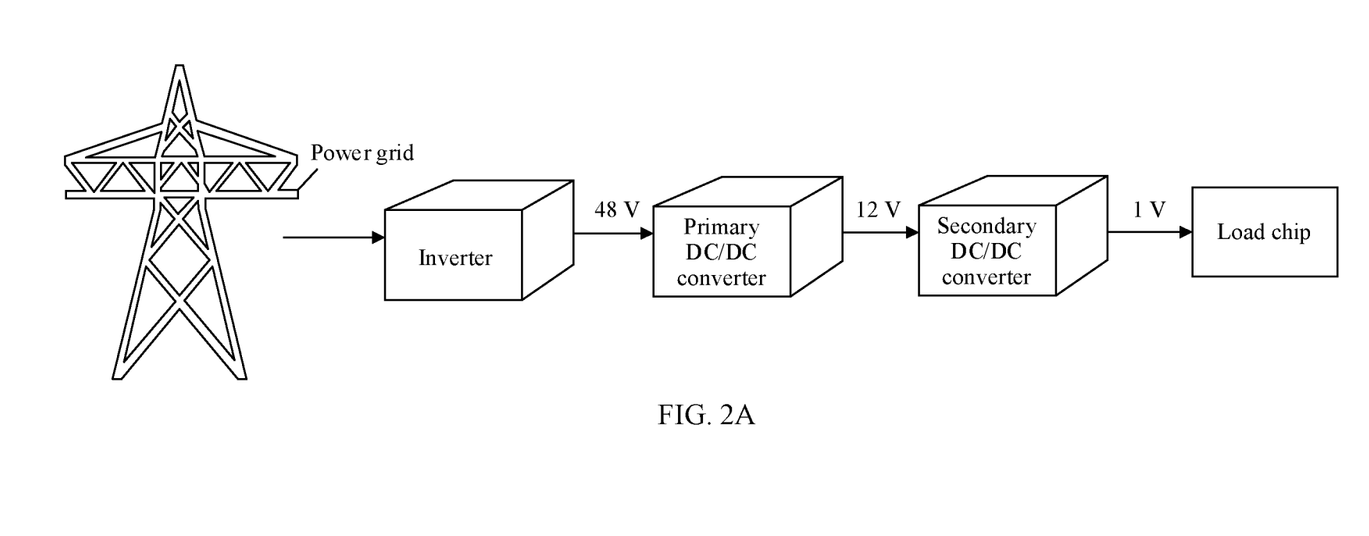
FIG. 2A is a schematic diagram of an application scenario of a power supply system according to this disclosure.

FIG. 2A is a schematic diagram of an application scenario of a power supply system according to this disclosure. As shown in FIG. 2A, the power supply system may include a power grid, an inverter, a primary DC/DC converter, and a secondary DC/DC converter. The power grid outputs an alternating current to an input end of the inverter. The inverter obtains a direct current voltage of 48 volts (V) after inverting the alternating current output by the power grid, and outputs the direct current voltage of 48 V to an input end of the primary DC/DC converter. The primary DC/DC converter obtains a direct current voltage of 12 V after performing step-down conversion on the direct current voltage of 48 V of the input end, and outputs the direct current voltage of 12 V to an input end of the secondary DC/DC converter. The secondary DC/DC converter obtains a direct current voltage of 1 V after performing step-down conversion on the direct current voltage of 12 V of the input end, and outputs the direct current voltage of 1 V to a load chip, to supply power to the load chip.

The primary DC/DC converter or the secondary DC/DC converter herein is a multi-level direct current converter in this disclosure. Because the multi-level direct current converter has a simple structure and low circuit costs, stability of the power supply system can be improved, and costs of the power supply system can be reduced, so that applicability is strong.

Figure 2B:
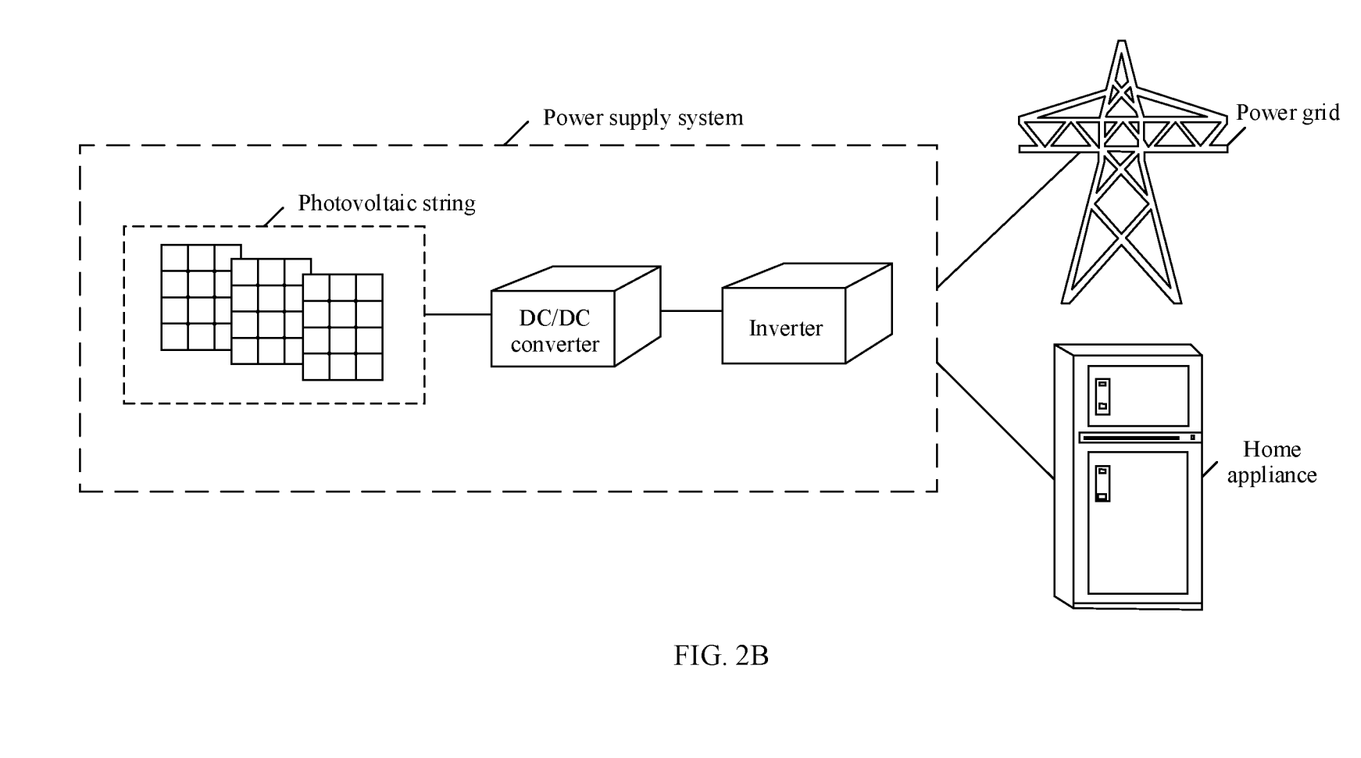
FIG. 2B is a schematic diagram of another application scenario of a power supply system according to this disclosure.

FIG. 2B is a schematic diagram of another application scenario of a power supply system according to this disclosure. As shown in FIG. 2B, the power supply system may include a photovoltaic string, a DC/DC converter, and an inverter. Each photovoltaic string may include a plurality of photovoltaic components connected in series and/or connected in parallel. An input end of the DC/DC converter is connected to the photovoltaic string, and is configured to convert, through direct current conversion, a direct current voltage generated by the photovoltaic string connected to the input end into a direct current whose voltage is a preset value, and output the direct current to the inverter. An input end of the inverter is connected to an output end of the DC/DC converter, and is configured to invert the direct current output by the DC/DC converter into an alternating current, to supply power to various types of electrical equipment such as an alternating current power grid or an alternating current load (such as a home appliance).

Optionally, the power supply system may further include a direct current combiner box (not shown in the figure). The direct current combiner box may be disposed between a plurality of photovoltaic strings and the input end of the DC/DC converter, and is configured to combine input electric energy of the plurality of photovoltaic strings and then output combined electric energy. Because each input of the direct current combiner box is independently equipped with a solar photovoltaic direct-current high-voltage lightning protection circuit, the direct current combiner box has a multi-level lightning protection function, to ensure that a lightning stroke does not affect normal output of a photovoltaic array, thereby improving stability of the power supply system.

Optionally, the power supply system may further include a direct current circuit breaker (not shown in the figure). The direct current circuit breaker may be disposed between the photovoltaic string and the input end of the DC/DC converter, and is configured to trigger overcurrent protection when an absolute value of a current exceeds a specific range of a rated current value, to cut off a current in a loop, thereby protecting the power supply system.

Optionally, if the power supply system includes a plurality of DC/DC converters, the power supply system may further include a direct current bus, and output ends of the DC/DC converters are connected to the input end of the inverter after being connected to the direct current bus in parallel.

The DC/DC converter herein is a multi-level direct current converter in this disclosure. Because the multi-level direct current converter has a simple structure and low circuit costs, stability of the power supply system can be improved, and costs of the power supply system can be reduced, so that applicability is strong.

The foregoing merely show examples of an application scenario of the multi-level direct current converter provided in this disclosure, but is not exhaustive. The application scenario is not limited in this disclosure.

The following provides, with reference to FIG. 3 to FIG. 7, example descriptions of an operating principle of the multi-level direct current converter provided in this disclosure.

Figure 3:
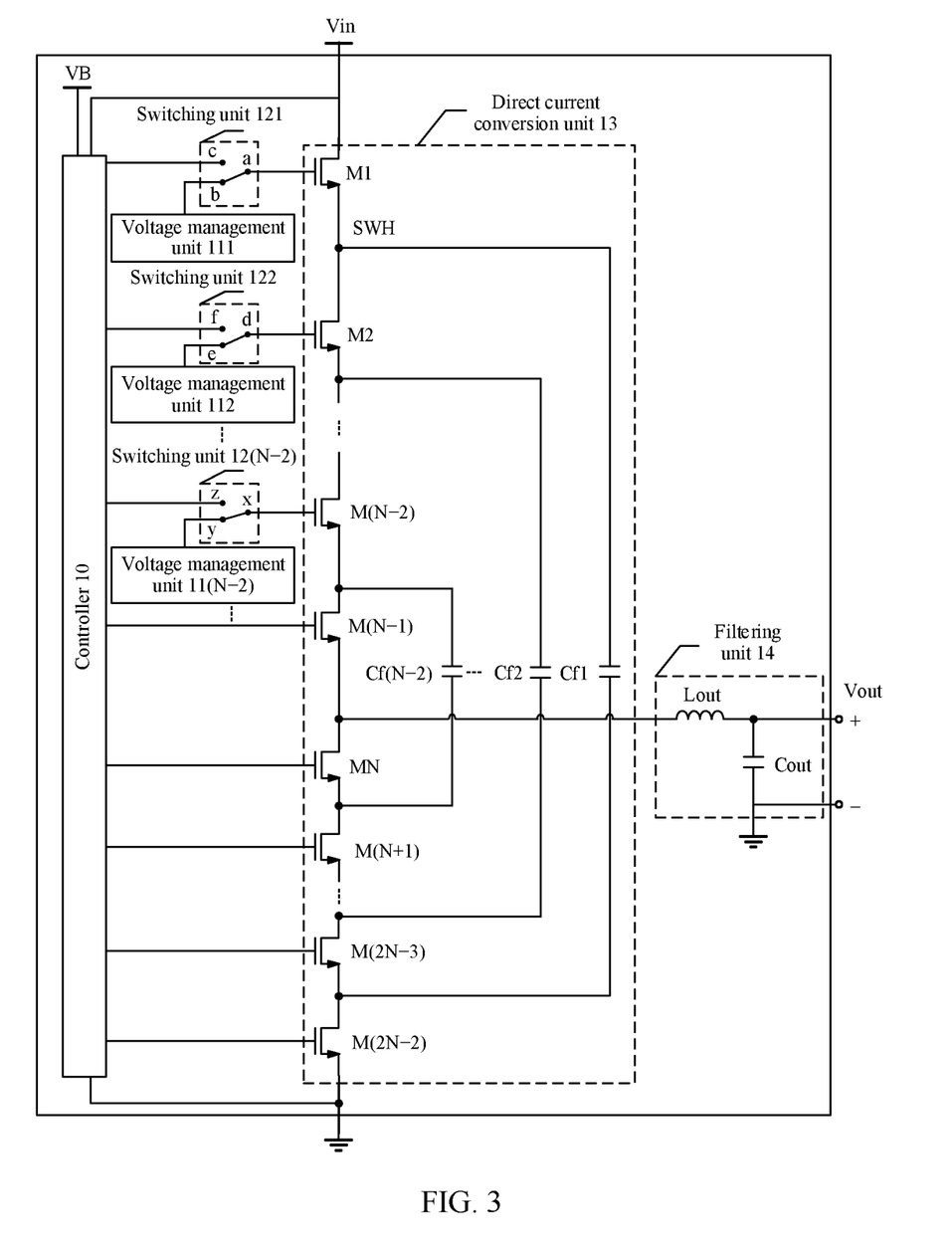
FIG. 3 is a schematic diagram of a structure of a multi-level direct current converter according to this disclosure.

FIG. 3 is a schematic diagram of a structure of a multi-level direct current converter according to this disclosure. As shown in FIG. 3, the multi-level direct current converter (an N-level direct current converter, where N is an integer greater than 2) includes a controller 10, a voltage management unit 111, a switching unit 121, and a direct current conversion unit 13. The direct current conversion unit 13 includes a flying capacitor Cf1 and at least two power transistors connected in series. The power transistors may be MOSFETs. The at least two power transistors connected in series include a first power transistor M1 and a second power transistor M(2N−2). A drain of M1 is connected to a voltage input end Vin of the N-level direct current converter, a source of M1 is connected to a drain of M(2N−2) by using Cf1, and a source of M(2N−2) is connected to a reference ground. Optionally, the at least two power transistors connected in series further include power transistors M2, . . . , M(N−2), M(N−1), MN, M(N+1), . . . , and M(2N−3). A drain of M2 is connected to the source of M1, . . . , a source of M(N−2) is connected to a drain of M(N−1), a source of M(N−1) is connected to a drain of MN, a source of MN is connected to a drain of M(N+1), . . . , and a source of M(2N−3) is connected to the drain of M(2N−2). Optionally, the N-level direct current converter further includes flying capacitors Cf2 to Cf(N−2), a voltage management unit 112, . . . , a voltage management unit 11(N−2), a switching unit 122, . . . , and a switching unit 12(N−2). A source of M2 is connected to a drain of M(2N−3) by using Cf2, . . . , and the source of M(N−2) is connected to the drain of M(N+1) by using Cf(N−2). Optionally, the N-level direct current converter further includes a filtering unit 14. The filtering unit 14 includes an inductor Lout and a capacitor Cout. The filtering unit 14 may filter a ripple in an output voltage of the N-level direct current converter, to obtain a direct current signal with a better property. It should be noted that, usually, in the N-level direct current converter, there are a total of 2N−2 power transistors connected in series, and there is a total of N−2 flying capacitors.

When the N-level direct current converter starts, before the power transistors start to be switched, capacitances of the N−2 flying capacitors in the N-level direct current converter need to reach preset multiples of an input voltage through precharging, that is, a voltage of the flying capacitor Cf1 needs to reach (Vin*(N−2))/(N−1) through precharging, a voltage of the flying capacitor Cf2 needs to reach (Vin*(N−3))/(N−1) through precharging, . . . , and a voltage of the flying capacitor Cf(N−2) needs to reach Vin/(N−1) through precharging, to ensure normal operating of the N-level direct current converter.

In an optional implementation, when the N-level direct current converter starts, the controller 10 detects an input voltage of the voltage input end Vin in real time. When the input voltage starts to rise from an initial voltage (for example, 0), that is, when the N-level direct current converter starts to be powered on, the controller 10 controls the switching unit 121 to connect an output end of the voltage management unit 111 to a gate of M1. Because a first end a is connected to the gate of M1, and a second end b is connected to the output end of the voltage management unit 111, the controller 10 may control the first end a to be connected to the second end b in the switching unit 121, to connect the output end of the voltage management unit 111 to the gate of M1. In addition, the controller 10 controls M(2N−2) to be conducted, to output a first preset voltage to the gate of M1 by using the voltage management unit 111. The first preset voltage is (Vin*(N−2))/(N−1)+Vgs, Vin is the input voltage of the voltage input end Vin of the N-level direct current converter, and Vgs is a voltage difference between a gate and a source in the MOSFET. A charging loop of Cf1 may be formed by using the voltage management unit 111, M1, and M(2N−2), and Cf1 may be precharged based on the first preset voltage input by the voltage management unit 111. Then, when the input voltage of the voltage input end Vin rises to a target voltage, the controller 10 controls the first end a to be connected to a third end c in the switching unit 121, and controls M(2N−2) to be cut off. In this case, the voltage of Cf1 is (N−2)/(N−1) of the target voltage, and precharging is completed.

In an entire charging process, the existing power transistors in the N-level direct current converter are configured, to clamp a voltage of the source of M1 at (Vin*(N−2))/(N−1), clamp a voltage of the drain of M(2N−2) at a low level (for example, 0), that is, clamp a voltage of an upper plate of Cf1 at (Vin*(N−2))/(N−1), and clamp a voltage of a lower plate of Cf1 at the low level, to ensure that the voltage of Cf1 is always (Vin*(N−2))/(N−1) and voltage stress of M1 is always Vin−(Vin*(N−2))/(N−1)=Vin/(N−1) in the entire charging process. Therefore, no additional charging circuit is required in this manner, so that circuit costs are low, and voltage stress of M1 in the entire charging process can be reduced. In addition, when the voltage of Cf1 is (N−2)/(N−1) of the target voltage, charging automatically ends, without an overcharge risk. Therefore, precharging time of the flying capacitor Cf1 can be shortened by using a relatively large charging current.

Likewise, when detecting that the input voltage starts to rise from the initial voltage (for example, 0), the controller 10 controls the switching unit 122 to connect an output end of the voltage management unit 112 to a gate of M2. Because a first end d of the switching unit 122 is connected to the gate of M2, and a second end e is connected to the output end of the voltage management unit 112, the controller 10 may control the first end d to be connected to the second end e in the switching unit 122, to connect the output end of the voltage management unit 112 to the gate of M2. In addition, the controller 10 controls the power transistors M(2N−3) and M(2N−2) to be conducted, to output a second preset voltage to the gate of M2 by using the voltage management unit 112. The second preset voltage is (Vin*(N−3))/(N−1)+Vgs. A charging loop of Cf2 may be formed by using the voltage management unit 112, M2, M(2N−3), and M(2N−3), and Cf2 is precharged based on the second preset voltage input by the voltage management unit 112. Then, when the input voltage of the voltage input end Vin rises to the target voltage, the controller 10 controls the first end d to be connected to a third end f in the switching unit 122, and controls M(2N−2) and M(2N−3) to be both cut off. In this case, the voltage of Cf2 is (N−3)/(N−1) of the target voltage, and precharging is completed.

In an entire charging process, the existing power transistors in the N-level direct current converter are configured, to clamp a voltage of the source of M2 at (Vin*(N−3))/(N−1), clamp a voltage of the drain of M(2N−3) at a low level (for example, 0), that is, clamp a voltage of an upper plate of Cf1 at (Vin*(N−3))/(N−1), and clamp a voltage of a lower plate of Cf1 at the low level, to ensure that the voltage of Cf1 is always (Vin*(N−3))/(N−1) and voltage stress of M2 is always (Vin*(N−2))/(N−1)−(Vin*(N−3))/(N−1)=Vin/(N−1) in the entire charging process. Therefore, no additional charging circuit is required in this manner, so that circuit costs are low, and voltage stress of M2 in the entire charging process can be reduced. In addition, when the voltage of Cf2 is (N−3)/(N−1) of the target voltage, charging automatically ends, without an overcharge risk. Therefore, precharging time of the flying capacitor Cf2 can be shortened by using a relatively large charging current.

Likewise, when detecting that the input voltage starts to rise from the initial voltage (for example, 0), the controller 10 controls the switching unit 12(N−2) to connect an output end of the voltage management unit 11(N−2) to a gate of M(N−2). Because a first end x of the switching unit 12(N−2) is connected to the gate of M(N−2), and a second end y is connected to the output end of the voltage management unit 11(N−2), the controller 10 may control the first end x to be connected to the second end y in the switching unit 12(N−2), to connect the output end of the voltage management unit 11(N−2) to the gate of M(N−2). In addition, the controller 10 controls the power transistors M(N−1), MN, . . . , M(2N−3), and M(2N−2) to be all conducted, to output an $(N-2)^{th}$ preset voltage to the gate of M(N−2) by using the voltage management unit 11(N−2). The $(N-2)^{th}$ preset voltage is Vin/(N−1)+Vgs. A charging loop of Cf(N−2) may be formed by using the voltage management unit 11(N−2), M(N−2), M(N−1), MN, M(2N−3), and M(2N−3), and Cf(N−2) is precharged based on the $(N-2)^{th}$ preset voltage input by the voltage management unit 11(N−2). Then, when the input voltage of the voltage input end Vin rises to the target voltage, the controller 10 controls the first end x to be connected to a third end z in the switching unit 12(N−2), and controls M(N−1), MN, M(2N−2), and M(2N−3) to be all cut off. In this case, the voltage of Cf(N−2) is 1/(N−1) of the target voltage, and precharging is completed.

In an entire charging process, the existing power transistors in the N-level direct current converter are configured, to clamp a voltage of the source of M(N−2) at Vin/(N−1), clamp a voltage of the drain of M(N+1) at a low level (for example, 0), that is, clamp a voltage of an upper plate of Cf(N−2) at Vin/(N−1), and clamp a voltage of a lower plate of Cf(N−2) at the low level, to ensure that the voltage of Cf(N−2) is always Vin/(N−1) and voltage stress of M(N−2) is always Vin/(N−1) in the entire charging process. Therefore, no additional charging circuit is required in this manner, so that circuit costs are low, and voltage stress of M2 in the entire charging process can be reduced. In addition, when the voltage of Cf(N−2) is 1/(N−1) of the target voltage, charging automatically ends, without an overcharge risk. Therefore, precharging time of the flying capacitor Cf(N−2) can be shortened by using a relatively large charging current.

According to the foregoing manner, in a process in which the input voltage of the voltage input end Vin of the N-level direct current converter rises from the initial voltage to the target voltage, precharging processes of the N−2 flying capacitors can be completed, without an additional charging circuit, so that circuit costs are low, and applicability is strong.

It may be understood that when the N-level direct current converter includes a plurality of flying capacitors, the flying capacitors in the N-level direct current converter are consistent in a precharging process. For ease of description, the following uses a three-level direct current converter (N is 3) as an example for description. In this case, there are four power transistors connected in series and a total of one flying capacitor in the three-level direct current converter.

Figure 4:
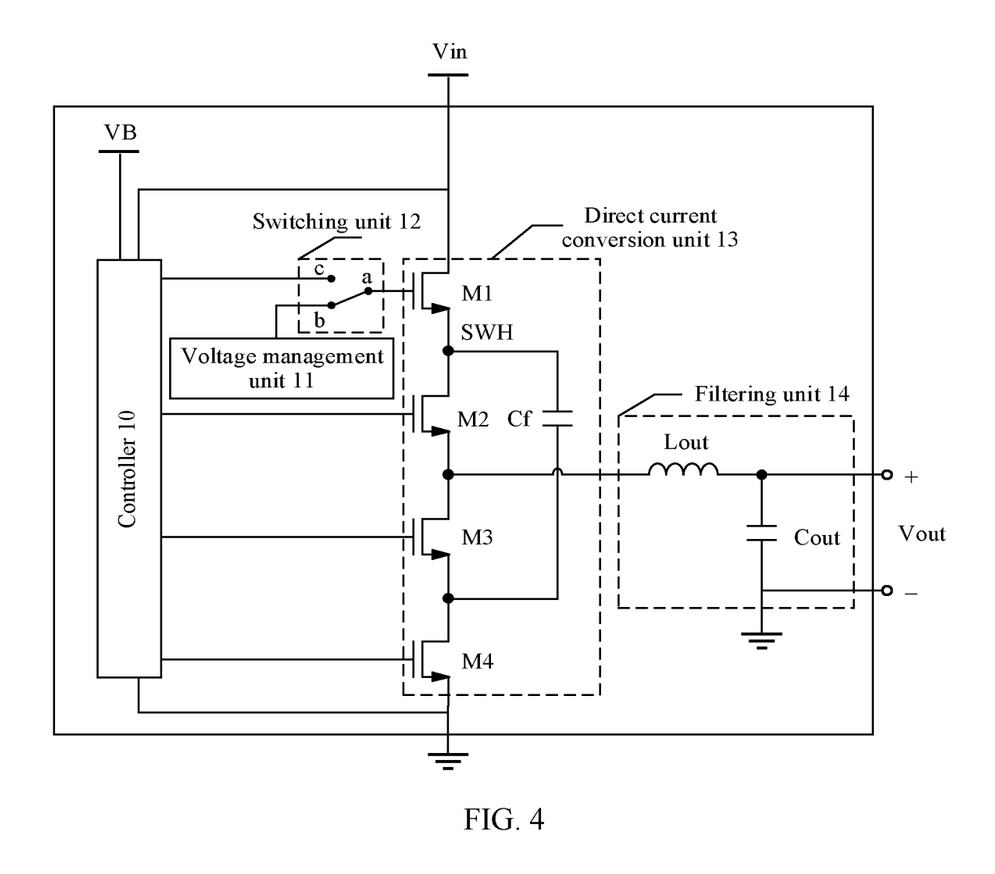
FIG. 4 is a schematic diagram of a structure of a three-level direct current converter according to this disclosure.

FIG. 4 is a schematic diagram of a structure of a three-level direct current converter according to this disclosure. As shown in FIG. 4, the three-level direct current converter includes a controller 10, a voltage management unit 11, a switching unit 12, and a direct current conversion unit 13. The direct current conversion unit 13 includes a flying capacitor Cf and four power transistors connected in series, including a first power transistor M1, a fifth power transistor M2, a sixth power transistor M3, and a second power transistor M4. A drain of M1 is connected to a voltage input end Vin of the three-level direct current converter, a source of M1 is connected to a drain of M2, a source of M2 is connected to a drain of M3, a source of M3 is connected to a drain of M4, and a source of M4 is connected to a reference ground. The source of M1 is connected to the drain of M4 by using Cf. A gate of M1 is separately connected to the controller 10 and the voltage management unit 11 by using the switching unit 12, and gates of M2, M3, and M4 are all connected to the controller 10.

In an optional implementation, when the three-level direct current converter starts, the controller 10 detects an input voltage of the voltage input end Vin in real time. When the input voltage starts to rise from an initial voltage (for example, 0), that is, when the three-level direct current converter starts to be powered on, the controller 10 controls the switching unit 12 to connect an output end of the voltage management unit 11 to the gate of M1. Because a first end a is connected to the gate of M1, and a second end b is connected to the output end of the voltage management unit 11, the controller 10 may control the first end a to be connected to the second end b in the switching unit 12, to connect the output end of the voltage management unit 11 to the gate of M1. In addition, the controller 10 controls M4 to be conducted, to output a preset voltage to the gate of M1 by using the voltage management unit 11. A value of the preset voltage is Vin/2+Vgs, Vin is the input voltage of the voltage input end Vin of the three-level direct current converter, and Vgs is a voltage difference between a gate and a source in a MOSFET. A charging loop of Cf may be formed by using the voltage management unit 11, M1, and M4, and Cf is precharged based on the preset voltage input by the voltage management unit 11. Then, when the input voltage of the voltage input end Vin rises to a target voltage, the controller 10 controls the first end a to be connected to a third end c in the switching unit 12, and controls M4 to be cut off.

In an entire charging process, the existing power transistors in the three-level direct current converter are configured, to clamp a voltage of the source of M1 at Vin/2, clamp a voltage of the drain of M4 at a low level (for example, 0), that is, clamp a voltage of an upper plate of Cf at Vin/2, and clamp a voltage of a lower plate of Cf at the low level, to ensure that a voltage of Cf and voltage stress of M1 are always both Vin/2 in the entire charging process. Therefore, no additional charging circuit is required in this manner, so that circuit costs are low, and voltage stress of M1 in the entire charging process can be reduced. In addition, when the voltage of Cf1 is ½ of the target voltage, charging automatically ends, without an overcharge risk. Therefore, precharging time of the flying capacitor Cf can be shortened by using a relatively large charging current.

Figure 5:
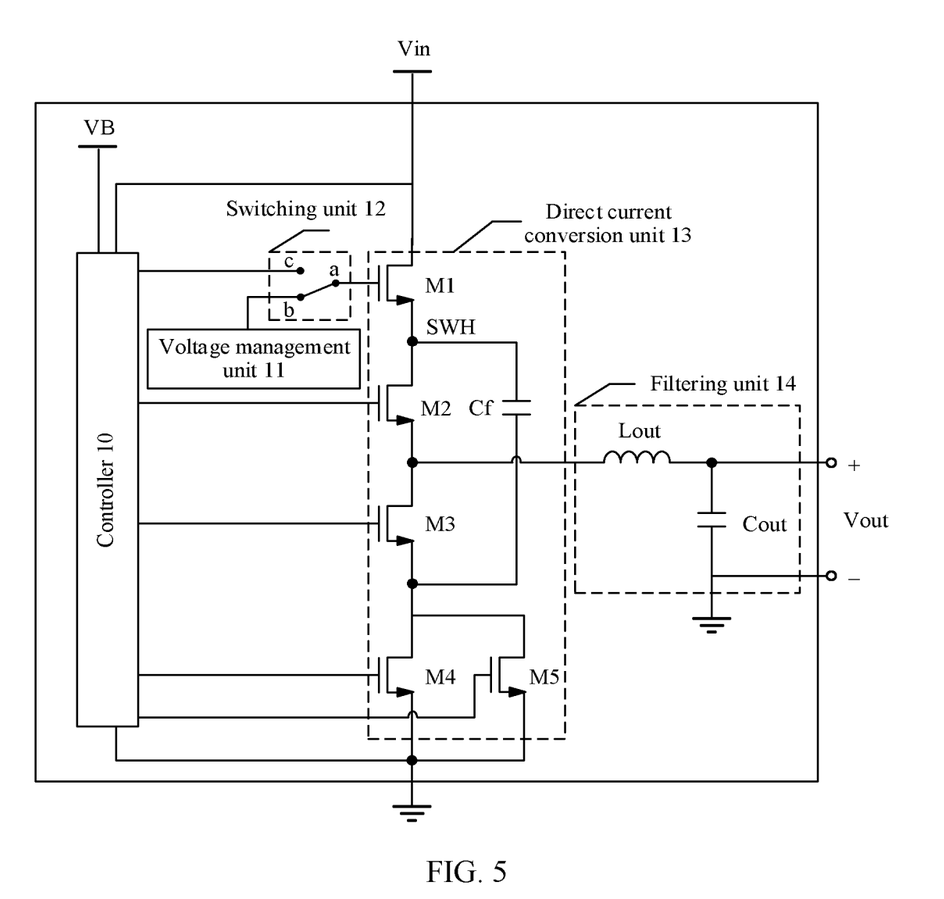
FIG. 5 is a schematic diagram of another structure of a three-level direct current converter according to this disclosure.

Further, the direct current conversion unit 13 shown in FIG. 4 may further include a fourth power transistor. For details, refer to FIG. 5. FIG. 5 is a schematic diagram of another structure of a three-level direct current converter according to this disclosure. As shown in FIG. 5, the direct current conversion unit 13 may further include a fourth power transistor M5, and M5 may be a MOSFET. A drain of M5 is connected to the drain of M4, a source of M5 is connected to the source of M4, and a gate of M5 is connected to the controller 10.

In an optional implementation, when detecting that the input voltage of the voltage input end Vin starts to rise from the initial voltage (for example, 0), the controller 10 may further control M5 to be conducted, until the input voltage of the voltage input end Vin is the target voltage. It may be understood that a parallel charging branch circuit may be added by adding a parallel power transistor, to increase a charging current, thereby shortening precharging duration of Cf. In addition, the precharge duration of Cf may be alternatively shortened by increasing a quantity of power transistors connected to M1 in parallel. It should be noted that a quantity of power transistors connected to M4 in parallel and the quantity of power transistors connected to M1 in parallel are not limited in this disclosure.

The voltage management unit 11 shown in FIG. 4 and FIG. 5 may output a voltage of a preset voltage value Vin/2+Vgs by using a voltage follower, a clamp circuit, or the like.

Figure 6:
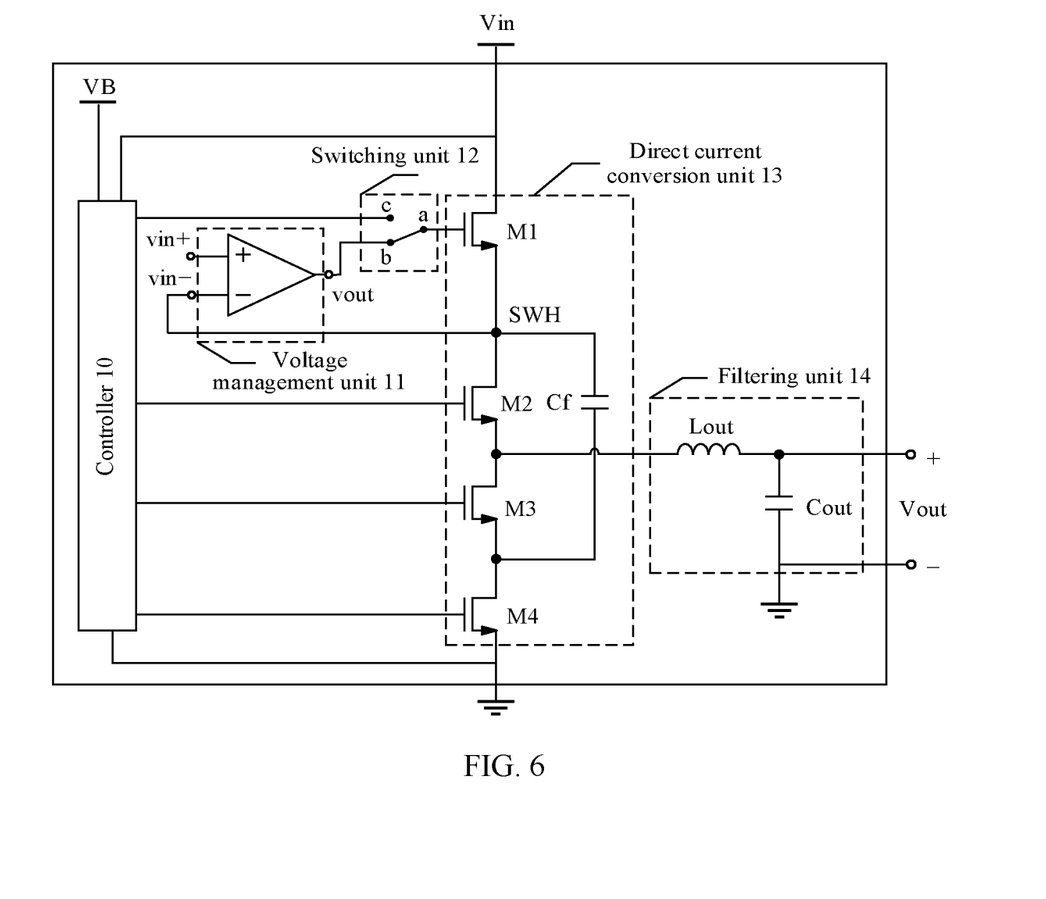
FIG. 6 is a schematic diagram of still another structure of a three-level direct current converter according to this disclosure.

In an optional implementation, FIG. 6 is a schematic diagram of still another structure of a three-level direct current converter according to this disclosure. As shown in FIG. 6, the voltage management unit 11 is a voltage follower. Because a multi-level direct current converter is an N-level direct current converter, and an input voltage of a non-inverting input end of the voltage follower is Vin*(N−2)/(N−1), N is 3 in the three-level direct current converter, and in this case, the input voltage of the non-inverting input end vin+ of the voltage follower is Vin/2. An inverting input end vin− is connected to the source of M1, and an output end vout (the output end of the voltage management unit 11) is connected to the second end b of the switching unit 12. According to a concept of a virtual short circuit, it can be learned that a voltage of the inverting input end vin− and the voltage of the non-inverting input end vin+ of the voltage follower are equal and are both Vin/2, that is, the voltage of the source of M1 is Vin/2. Therefore, a voltage of the output end vout of the voltage follower is Vin/2+Vgs. Because the voltage follower has a simple structure, an area is reduced, and applicability is strong.

Figure 7:
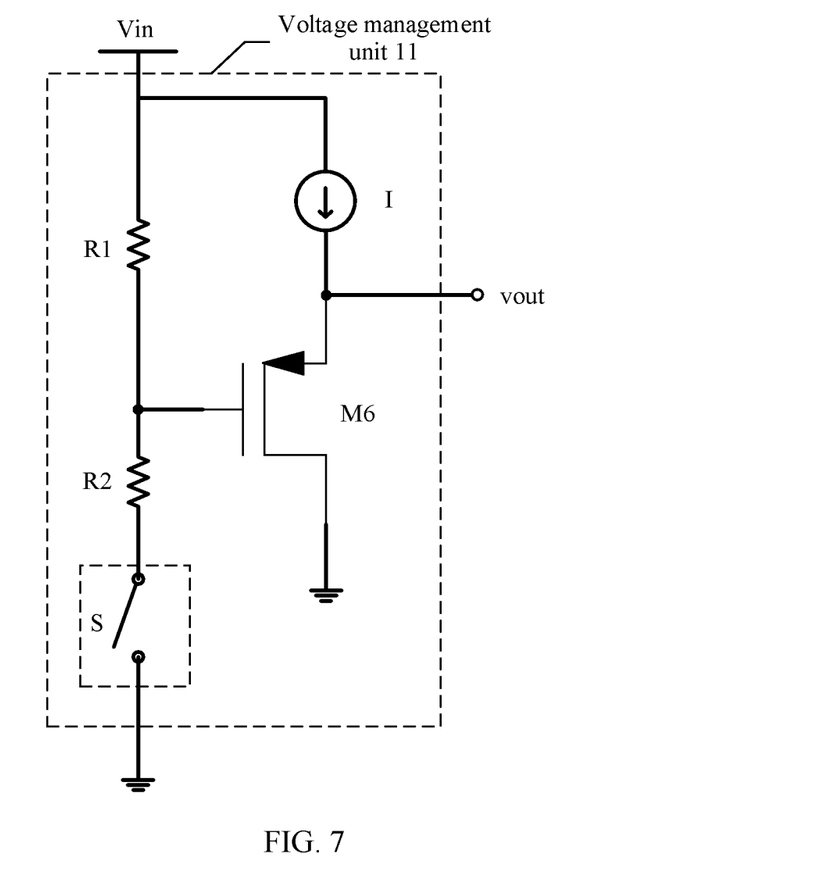
FIG. 7 is a schematic diagram of a structure of a voltage management unit according to this disclosure.

In another optional embodiment, FIG. 7 is a schematic diagram of a structure of a voltage management unit according to this disclosure. As shown in FIG. 7, the voltage management unit 11 is a clamp circuit, and includes a first resistor R1, a second resistor R2, a direct current source I, and a third power transistor M6. The third power transistor M6 may be a MOSFET. One end of the first resistor R1 is connected to the voltage input end Vin of the three-level direct current converter and one end of the direct current source I, the other end of the first resistor R1 is connected to one end of the second resistor R2 and a gate of the third power transistor M6, the other end of the second resistor R2 is connected to a reference ground, the other end of the direct current source I is connected to a source of the third power transistor M6, and a drain of the third power transistor M6 is connected to a reference ground. The source (vout) of the third power transistor M6 is the output end of the voltage management unit 11, and the output end vout is connected to the second end b of the switching unit 12 in FIG. 5. Optionally, in addition to providing a bias current (used to generate a voltage difference Vsg between the source and the gate of M6) for M6 by being connected to the voltage input end Vin of the three-level direct current converter, one end of the direct current source I may further provide a bias current for M6 by being connecting to another end that provides a voltage value equal to the input voltage of the voltage input end Vin of the three-level direct current converter. This is not limited in this disclosure.

Because a multi-level direct current converter is an N-level direct current converter, a ratio between a resistance value of the first resistor and a resistance value of the second resistor is 1/(N−2). Therefore, N is 3 in the three-level direct current converter, and in this case, a ratio between a resistance value of the first resistor R1 and a resistance value of the second resistor R2 is 1, that is, the resistance value of the first resistor R1 is equal to the resistance value of the second resistor R2.

When the voltage management unit 11 includes no switch S, because the resistance value of R1 is equal to the resistance value of R2, a voltage of the gate of M6 is Vin/2. In addition, because the current generated by the current source I causes the voltage difference Vsg between the source and the gate of M6, and a voltage difference Vsg between a source and a gate in a PMOS is approximately equal to a voltage difference Vgs between a gate and a source in an NMOS, a voltage of the output end out of the voltage management unit 11 is Vin/2+Vgs.

Optionally, the voltage management unit 11 may further include a switch S, and the switch S may be in an open state when the flying capacitor does not need to be precharged, thereby reducing power consumption.

Further, when detecting that the input voltage of the voltage input end Vin starts to rise from the initial voltage (for example, 0), the controller 10 controls the switch S to be closed. In this case, the voltage of the gate of M6 is Vin/2. Because the current generated by the current source I causes the voltage difference Vsg between the source and the gate of M6. Therefore, in this case, a voltage of the output end out of the voltage management unit 11 is Vin/2+Vgs. When the input voltage of the voltage input end Vin rises to the target voltage, the controller 10 controls S to be open. The clamp circuit is easy to operate, and has high flexibility.

It should be noted that, in addition to being directly controlled by the controller 10, the second power transistor in FIG. 3 to FIG. 7 may be indirectly controlled by the controller 10 by controlling a sequential circuit. This is not limited in this disclosure.

In this disclosure, a charging loop of a flying capacitor may be formed by configuring existing power transistors in a multi-level direct current converter, to precharge the flying capacitor, without an additional charging component, so that a structure is simple, circuit costs are low, and applicability is strong.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A multi-level direct current converter comprising:
   a voltage input end configured to receive a first input voltage;
   a switching system;
   a voltage management system comprising a first output end configured to provide a preset voltage;
   a direct current conversion system comprising:
      a flying capacitor; and
      at least two power transistors coupled in series, wherein the at least two power transistors comprise:

a first power transistor comprising:
  a first end coupled to the voltage input end;
  a second end; and
  a third end coupled to the first output end by the switching system and configured to receive the preset voltage; and
a second power transistor comprising:
  a fourth end coupled to the second end by the flying capacitor;
  a fifth end coupled to a reference ground; and
  a sixth end; and
a controller coupled to the switching system and the sixth end and configured to:
  detect that the first input voltage starts to rise from an initial voltage;
  control, in response to detecting that the first input voltage starts to rise from the initial voltage, the switching system to couple the voltage management system to the first power transistor; and
  control, in response to detecting that the first input voltage starts to rise from the initial voltage, the second power transistor to conduct.

2. The multi-level direct current converter of claim 1, wherein the voltage management system is a voltage follower comprising:
a non-inverting input end having a second input voltage based on the first input voltage;
an inverting input end coupled to the second end; and
a second output end configured as the first output end.

3. The multi-level direct current converter of claim 2, wherein the multi-level direct current converter is an N-level direct current converter, wherein the second input voltage is $(N-2)/(N-1)$ of the first input voltage, and wherein N is an integer greater than two.

4. The multi-level direct current converter of claim 1, wherein the multi-level direct current converter is an N-level direct current converter, and wherein the voltage management system further comprises:
a first resistor comprising:
  a seventh end coupled to the voltage input end; and
  an eighth end;
a second resistor comprising:
  a ninth end coupled to the eighth end; and
  a tenth end coupled to the reference ground;
a direct current source comprising:
  an eleventh end coupled to the seventh end; and
  a twelfth end; and
a third power transistor comprising:
  a thirteenth end coupled to the eighth end;
  a fourteenth end coupled to the twelfth end; and
  a fifteenth end coupled to the reference ground,
wherein a ratio between a first resistance value of the first resistor and a second resistance value of the second resistor is $1/(N-2)$, and
wherein N is an integer greater than two.

5. The multi-level direct current converter of claim 4, wherein the third power transistor is a metal-oxide-semiconductor field-effect transistor (MOSFET), wherein the thirteenth end is a gate of the third power transistor, wherein the fourteenth end is a source of the third power transistor, and wherein the fifteenth end is a drain of the third power transistor.

6. The multi-level direct current converter of claim 1, wherein the controller is further configured to:
identify that the first input voltage rises to a target voltage;
control, in response to identifying that the first input voltage rises to the target voltage, the switching system to decouple the voltage management system from the first power transistor and couple the controller to the third end; and
control the second power transistor to be cut off.

7. The multi-level direct current converter of claim 1, wherein the direct current conversion system further comprises a third power transistor coupled to the second power transistor in parallel and further coupled to the controller, and wherein the controller is further configured to:
identify that the first input voltage starts to rise from the initial voltage; and
control, in response to identifying that the first input voltage starts to rise from the initial voltage, the third power transistor to be conducted until the first input voltage is a target voltage.

8. The multi-level direct current converter of claim 1, wherein the multi-level direct current converter is a three-level direct current converter, and wherein the at least two power transistors further comprise:
a third power transistor comprising:
  a seventh end coupled to the second end;
  an eighth end; and
  a ninth end coupled to the controller; and
a fourth power transistor comprising:
  a tenth end coupled to the eighth end;
  an eleventh end coupled to the fourth end; and
  a twelfth end coupled to the controller.

9. The multi-level direct current converter of claim 1, wherein each of the at least two power transistors is a metal-oxide-semiconductor field-effect transistor (MOSFET), wherein each of the first end and the fourth end is a drain of each of the at least two power transistors, wherein each of the second end and the fifth end is a source of each of the at least two power transistors, and wherein each of the third end and the sixth end is a gate of each of the at least two power transistors.

10. A power supply system comprising:
a photovoltaic string; and
a multi-level direct current converter coupled to the photovoltaic string, and comprising:
  a voltage input end configured to receive a first input voltage;
  a switching system;
  a voltage management system comprising a first output end and configured to provide a preset voltage for a first power transistor;
  a direct current conversion system comprising:
    a flying capacitor; and
    at least two power transistors coupled in series, wherein the at least two power transistors comprise;
      a first power transistor comprising:
        a first end coupled to the voltage input end;
        a second end; and
        a third end coupled to the first output end by the switching system and configured to receive the preset voltage; and
      a second power transistor comprising:
        a fourth end coupled to the second end by the flying capacitor;
        a fifth end coupled to a reference ground; and
        a sixth end; and a controller coupled to the switching system and the sixth end and configured to:
  detect that the first input voltage starts to rise from an initial voltage;
  control, in response to detecting that the first input voltage starts to rise from the initial voltage, the switching system to couple the voltage management system to the first power transistor; and
  control, in response to detecting that the first input voltage starts to rise from the initial voltage, the second power transistor to conduct.

11. The power supply system of claim 10, wherein the multi-level direct current converter further comprises an input end, wherein the power supply system further comprises a direct current circuit breaker, and wherein the photovoltaic string is further coupled to the input end by the direct current circuit breaker.

12. The power supply system of claim 10, wherein the multi-level direct current converter further comprises an input end, wherein the power supply system further comprises a direct current combiner box, and wherein the photovoltaic string is further coupled to the input end by the direct current combiner box.

13. The power supply system of claim 10, wherein the multi-level direct current converter further comprises a second output end, and wherein the power supply system further comprises an inverter coupled to the second output end.

14. The power supply system of claim 13, further comprising a direct current bus, and wherein the second output end is further coupled to the inverter by the direct current bus.

15. A multi-level direct current converter comprising:
  a voltage input end configured to receive a first input voltage;
  a voltage management system comprising:
    a first resistor comprising:
      a first end configured to couple to the voltage input end; and
      a second end;
    a second resistor comprising:
      a third end coupled to the second end; and
      a fourth end configured to couple to a reference ground;
    a direct current source comprising:
      a fifth end coupled to the first end; and
      a sixth end; and
    a power transistor comprising:
      a seventh end coupled to the second end;
      an eighth end coupled to the sixth end; and
      a ninth end configured to couple to the reference ground, wherein a ratio between a first resistance of the first resistor and a second resistance of the second resistor is $1/(N-2)$, and
    wherein N is an integer greater than two.

16. The multi-level direct current converter of claim 15, wherein the power transistor is a metal-oxide-semiconductor field-effect transistor (MOSFET).

17. The multi-level direct current converter of claim 16, wherein the seventh end is a gate of the MOSFET, wherein the eighth end is a source of the MOSFET, and wherein the ninth end is a drain of the MOSFET.

18. The multi-level direct current converter of claim 16, further comprising a switching system configured to couple and decouple the voltage management system from the power transistor.

19. The multi-level direct current converter of claim 15, wherein N is three, and wherein the first resistance is equal to the second resistance.

20. The multi-level direct current converter of claim 15, wherein the voltage management system is a voltage follower.

* * * * *